US009485139B2

(12) United States Patent
Ando

(10) Patent No.: US 9,485,139 B2
(45) Date of Patent: Nov. 1, 2016

(54) COMMUNICATION NODE, COMMUNICATION SYSTEM, AND METHOD FOR PERFORMING A COMMUNICATION

(71) Applicant: TOYOTA JIDOSHA KABUSHIKI KAISHA, Toyota-shi, Aichi (JP)

(72) Inventor: Hiroya Ando, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 482 days.

(21) Appl. No.: 13/872,210

(22) Filed: Apr. 29, 2013

(65) Prior Publication Data

US 2013/0238736 A1 Sep. 12, 2013

Related U.S. Application Data

(63) Continuation of application No. PCT/JP2010/070149, filed on Nov. 11, 2010.

(51) Int. Cl.
*G06F 15/173* (2006.01)
*H04L 12/24* (2006.01)
*H04L 12/40* (2006.01)

(52) U.S. Cl.
CPC ..... *H04L 41/0803* (2013.01); *H04L 12/40013* (2013.01); *H04L 2012/40241* (2013.01); *H04L 2012/40273* (2013.01)

(58) Field of Classification Search
CPC .......... H04L 12/40013; H04L 41/0803; H04L 2012/40273; H04L 2012/40241
See application file for complete search history.

(56) References Cited

U.S. PATENT DOCUMENTS

| | | | |
|---|---|---|---|
| 6,522,965 B1* | 2/2003 | Gierling | F16H 61/66254 477/37 |
| 6,826,607 B1* | 11/2004 | Gelvin | B60R 25/1004 340/539.19 |
| 2002/0007238 A1* | 1/2002 | Moriguchi | H04L 29/06 701/36 |
| 2004/0258001 A1 | 12/2004 | Remboski et al. | |
| 2007/0144814 A1* | 6/2007 | Arnold | B62D 6/008 180/402 |

(Continued)

FOREIGN PATENT DOCUMENTS

| | | | | |
|---|---|---|---|---|
| DE | 4134668 A1 * | 4/1993 | | B60W 10/02 |
| DE | 10 2007 010 763 A1 | 9/2008 | | |

(Continued)

*Primary Examiner* — Oanh Duong
(74) *Attorney, Agent, or Firm* — Finnegan, Henderson, Farabow, Garrett & Dunner, LLP

(57) ABSTRACT

A communication node includes a transmission and receipt setting part configured to perform a transmission setting or a receipt setting for each information based on a transmission request or a receipt request included in a transmission and receipt request information corresponding to a second communication node detected by a communication node detector among the transmission and receipt request information stored in a memory part, a communication part configured to transmit information representing the transmission setting or the receipt setting set by the transmission and receipt setting part and to receive information representing the transmission setting or the receipt setting from another first communication node, and a consistency determining part configured to determine consistency of the transmission setting or the receipt setting set by the transmission and receipt setting part and the transmission setting or the receipt setting received by the communication part from another first communication node.

10 Claims, 8 Drawing Sheets

(56) References Cited

U.S. PATENT DOCUMENTS

| | | | |
|---|---|---|---|
| 2008/0008103 A1* | 1/2008 | Suzuki | H04L 12/12 370/250 |
| 2008/0221752 A1 | 9/2008 | Jager et al. | |
| 2009/0041047 A1* | 2/2009 | Augustin | H04L 12/2697 370/402 |
| 2010/0046511 A1* | 2/2010 | Khalid | H04L 67/141 370/389 |
| 2010/0293303 A1* | 11/2010 | Choi | G07C 5/008 710/16 |

FOREIGN PATENT DOCUMENTS

| | | |
|---|---|---|
| JP | 2005-277978 | 10/2005 |
| JP | 2008-113339 | 5/2008 |
| JP | 2011030037 A * | 2/2011 |

* cited by examiner

FIG.2

| | \multicolumn{5}{c|}{MESSAGE ID} | |
|---|---|---|---|---|---|---|
| | aa | bb | cc | dd | ... | |
| SECOND COMMUNICATION NODE 200₁ | TRANSMISSION | NEITHER | RECEIPT | NEITHER | ... | |
| SECOND COMMUNICATION NODE 200₂ | RECEIPT | RECEIPT | RECEIPT | NEITHER | ... | |
| SECOND COMMUNICATION NODE 200₃ | NEITHER | NEITHER | NEITHER | NEITHER | ... | |
| ... | | | ... | | | |

FIG.3

| MESSAGE ID | | | | |
|---|---|---|---|---|
| aa | bb | cc | dd | ... |
| TRANSMISSION | RECEIPT | RECEIPT | NO COMMUNICATION | ... |

FIG.4

| | MESSAGE ID | | | | |
|---|---|---|---|---|---|
| | aa | bb | cc | dd | ... |
| FIRST COMMUNICATION NODE 100₁ | TRANSMISSION | RECEIPT | RECEIPT | NO COMMUNICATION | ... |
| FIRST COMMUNICATION NODE 100₂ | NO COMMUNICATION | RECEIPT | RECEIPT | TRANSMISSION | ... |
| FIRST COMMUNICATION NODE 100₃ | RECEIPT | TRANSMISSION | NO COMMUNICATION | TRANSMISSION | ... |
| FIRST COMMUNICATION NODE 100₄ | RECEIPT | RECEIPT | RECEIPT | RECEIPT | ... |

COMMUNICATION NODE, COMMUNICATION SYSTEM, AND METHOD FOR PERFORMING A COMMUNICATION

TECHNICAL FIELD

The present invention relates to a communication system mounted on a vehicle, for example.

BACKGROUND ART

A car-mounted network is provided on a vehicle for the sake of performing various controls in a vehicle. The car-mounted network is realized by connecting a lot of Electronic Control Units (ECUs), sensors, actuators or the like to a LAN. Hereinafter, an Electronic Control Unit (ECU), a sensor, an actuator or the like that are connected to the car-mounted network is referred to as a "communication node". The communication nodes can be disposed in various places in the vehicle. The communication nodes are connected by communication wires or electric cables.

Patent Document 1: Japanese Laid-Open Patent Application No. 2008-113339

SUMMARY OF INVENTION

Problem to be Solved by the Invention

The car-mounted network is composed by connecting data buses to the plural communication nodes, for example. A Controller Area Network (CAN) or a Local Interconnect Network (LIN) is included in the car-mounted network. A device, an element or the like which can perform a communication according to FlexRay (registered trademark) may be included in the car-mounted network.

For example, in the car-mounted network which performs a communication according to FlexRay, a scheduling of transmission and receipt of data between the communication nodes is performed in advance. In the car-mounted network, a message which is transmitted or received at a designated time is determined by the schedule. For example, the message includes a measured value of a meter or the like. Each communication node performs a communication in accordance with the schedule. In the car-mounted network, if the number of the communication nodes is changed, it is necessary for a communication node among the communication nodes which is affected by the change to perform rescheduling. The number of the communication nodes is changed when the number is increased by adding a communication node or is decreased by subtracting any one or more of the communication nodes.

In order to suppress the rescheduling performed in the communication node, it is suggested to include an Identification (ID) of the communication node into a payload segment of the message which is to be transmitted by the communication node (see, e.g., Patent Document 1). It is possible to send the message without changing a frame ID by changing the payload segment. If the number of the communication nodes is changed, it is not necessary for the communication node which is affected by the change to perform the rescheduling. This is because the schedule of the communication node is not changed by the change of the number.

However, in a case where a communication node is added to the car-mounted network, Patent Document 1 has no description of how to set the added communication node so that the added communication node can transmit and receive a message.

The present invention solves the problems as described above. It is an aspect of the present invention to provide a communication node and a communication system which can automatically perform a transmission setting and a receipt setting with regard to information transmitted and received between the communication nodes.

Means for Solving the Problems

According to one embodiment of the present invention, in order to achieve the object as described above, an embodiment of the present invention provides a communication node used in a communication system including plural first communication nodes and one or more second communication nodes which perform transmission or receipt of a signal with one of the first communication nodes, the communication node being any one of the first communication nodes, the communication node including, a communication node detector configured to detect the second communication node connected to the communication node, a transmission and receipt request memory part configured to store transmission and receipt request information representing a receipt request or a transmission request for each information transmitted or received between the communication node and the second communication node, the transmission and receipt request information being prepared for the second communication node connected to the communication node, the receipt request representing a request of the second communication node for receipt of information, the transmission request representing a request of the second communication node for transmission of information, a transmission and receipt setting part configured to perform a transmission setting or a receipt setting for each information based on the transmission request or the receipt request included in a transmission and receipt request information corresponding to the second communication node detected by the communication node detector among the transmission and receipt request information stored in the transmission and receipt request information memory part, a communication part configured to transmit information representing the transmission setting or the receipt setting set by the transmission and receipt setting part and to receive information representing the transmission setting or the receipt setting from another first communication node, and a consistency determining part configured to determine consistency of the transmission setting or the receipt setting set by the transmission and receipt setting part and the transmission setting or the receipt setting received by the communication part from another first communication node.

Another embodiment of the present invention provides a communication system including plural first communication nodes and one or more second communication nodes which perform transmission or receipt of a signal with one of the first communication nodes, the first communication node including, a communication node detector configured to detect the second communication node connected to the communication node, a transmission and receipt request memory part configured to store transmission and receipt request information representing a receipt request or a transmission request for each information transmitted or received between the communication node and the second communication node, the transmission and receipt request information being prepared for the second communication node connected to the communication node, the receipt request representing a request of the second communication node for receipt of information, the transmission request representing a request of the second communication node for transmission of information, a transmission and receipt setting part configured to perform a transmission setting or a receipt setting for each information based on the transmission request or the receipt request included in a transmission and receipt request information corresponding to the second communication node detected by the communication node detector among the transmission and receipt request information stored in the transmission and receipt request information memory part, a communication part configured to transmit information representing the transmission setting or the receipt setting set by the transmission and receipt setting part and to receive information representing the transmission setting or the receipt setting from another first communication node, and a consistency determining part configured to determine consistency of the transmission setting or the receipt setting set by the transmission and receipt setting part and the transmission setting or the receipt setting received by the communication part from another first communication node.

Yet another embodiment of the present invention provides a method for performing a communication in a communication system including plural first communication nodes and one or more second communication nodes which perform transmission or receipt of a signal with one of the first communication nodes, the method performed by the first communication node including, detecting the second communication node connected to the communication node, storing transmission and receipt request information representing a receipt request or a transmission request for each information transmitted or received between the communication node and the second communication node, the transmission and receipt request information being prepared for the second communication node connected to the communication node, the receipt request representing a request of the second communication node for receipt of information, the transmission request representing a request of the second communication node for transmission of information, performing a transmission setting or a receipt setting for each information based on the transmission request or the receipt request included in a transmission and receipt request information corresponding to the second communication node detected by the communication node detector among the transmission and receipt request information stored in the transmission and receipt request information memory part, transmitting information representing the transmission setting or the receipt setting set by the transmission and receipt setting part, receiving information representing the transmission setting or the receipt setting from another first communication node, and determining consistency of the transmission setting or the receipt setting set by the transmission and receipt setting part and the transmission setting or the receipt setting received by the communication part from another first communication node.

Effects of the Invention

In accordance with an embodiment disclosed hereinafter, it is possible to automatically perform a transmission setting and a receipt setting with regard to information transmitted and received between communication nodes.

BRIEF DESCRIPTION OF THE DRAWINGS

FIG. 2 is a diagram illustrating an example of a message transmission and receipt request table;

FIG. 3 is a diagram illustrating an example of a transmission and receipt setting;

FIG. 4 is a diagram illustrating an example of a transmission and receipt setting information table;

BEST MODE FOR CARRYING OUT THE INVENTION

Figure 1:
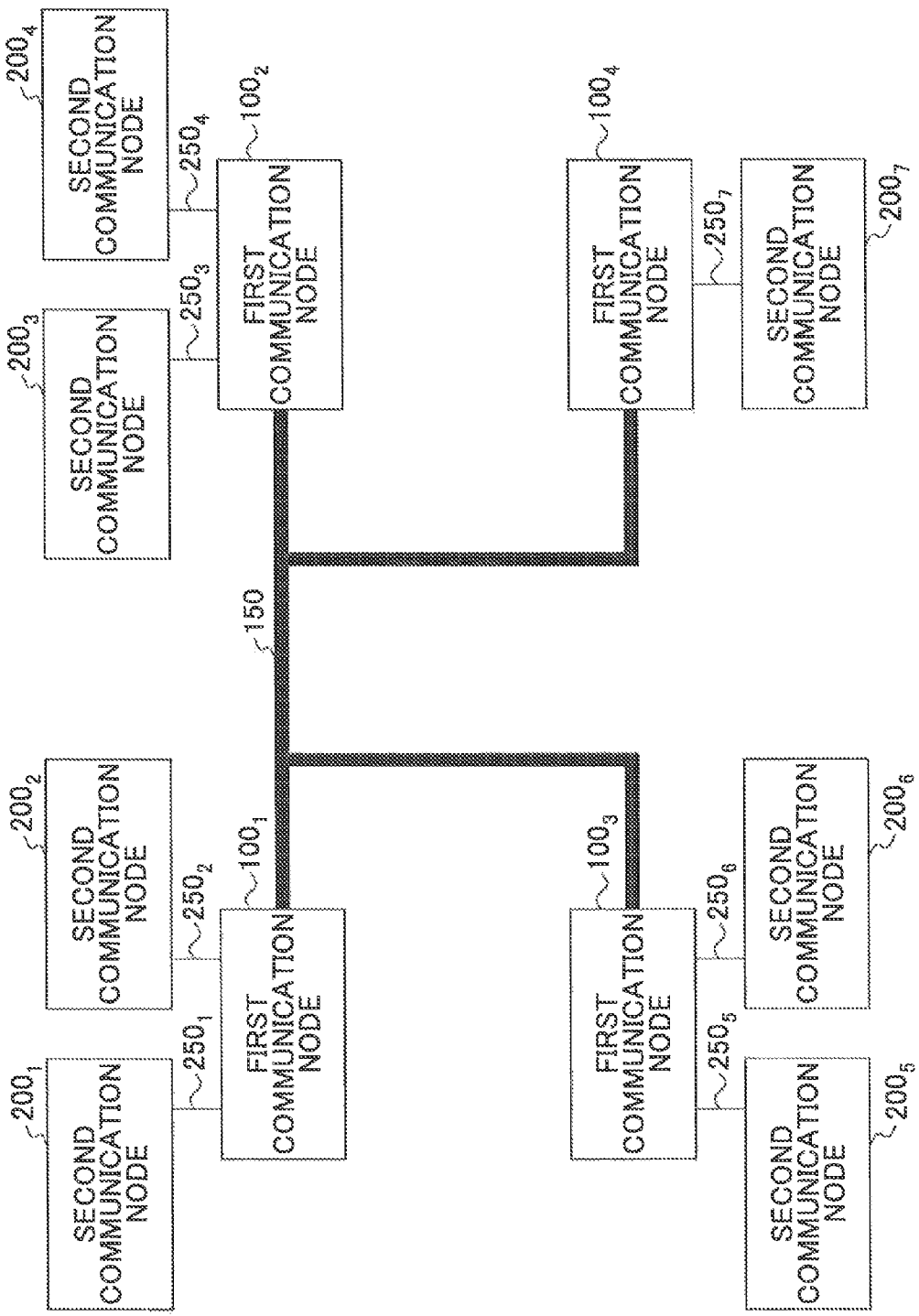
FIG. 1 is a diagram illustrating a communication system according to an embodiment.

In the following, preferred embodiments of the present invention are described with reference to the drawings.

Hereinafter, elements having the same function are referred to by the same reference numerals, and a description thereof is omitted in all FIGS.

<Embodiment>
<Communication System>

FIG. 1 is a diagram illustrating a communication system according to the present embodiment.

The communication system includes a first communication node $100n$ (n is an integer number greater than 0 (n>0)) and a second communication node $200m$ (m is an integer number greater than 0 (m>0)). In FIG. 4, n=4 and m=7, for example. Herein, the values of the integer numbers n and m can be changed. The first communication node $100n$ may be realized by an ECU or the like. The second communication node $200m$ may be realized by an ECU, a sensor, an actuator or the like. The first communication node $100n$ may include a number of systems. In this case, a communication function performed among the systems included in the first communication node $100n$ is realized by the first communication node $100n$. In a case where the first communication node $100n$ does not perform a communication among the systems included in the first communication node $100n$ and performs a communication in order to control another system which is not included in the first communication node $100n$, the communication is performed by a communication function realized by the second communication node $200m$. For example, in a case where the first communication node $100n$ includes a control function of an air conditioner, the control of the air conditioner is not performed by using the communication function of the first communication node. In this case, the control of the air conditioner is performed by using the communication function of the second communication node $200m$. The ECU may be an ECU used for a system control. The first communication node $100n$ and the second communication node $200m$ are mounted on a mobile object of a transportation such as a vehicle, for example. In the present embodiment, the first communication node $100n$ and the second communication node $200m$ are mounted on a vehicle, for example. Hereinafter, plural of the first communication nodes may be referred to as "first communication nodes $100x$" (x takes any integer number). Similarly, plural of the second communication nodes may be referred to as "second communication nodes $200y$" (y takes any integer number).

With regard to a communication performed among communication nodes included in a communication system mounted on a vehicle, there exists a part in which priority should be given to an increase of a communication capacity and a part in which priority should be given to a reduction of cost rather than an increase of a communication capacity. For example, in the communication system according to the present embodiment, the communication system includes a LAN configuration as illustrated hereinafter in order to satisfy both demands as described above.

It is possible to perform a high speed communication and a bulk data communication among plural of the first communication nodes $100x$. For example, a communication bus (hereinafter referred to as a "first bus $150$") connects plural of the first communication nodes $100x$. It is possible to communicate among plural of the first communication nodes $100x$ via the first bus $150$ by using a first communication protocol which supports the high speed communication and the bulk data communication. A topology of the first communication protocol is not limited to a bus type as illustrated in FIG. 1. The topology of the first communication protocol may be a star type. The topology of the first communication protocol may be a hybrid type in which the bus type and the star type are combined. According to the first communication protocol, a scheduling is performed in advance and thereby information to be communicated among the first communication nodes $100x$ and a time at which the information is to be communicated are set. FlexRay is included in the first communication protocol.

The second communication node $200m$ is a type of a communication node other than the first communication node $100n$. It is preferable that the second communication node $200m$ is connected to the closest first communication node among plural of the first communication nodes $100x$. For example, second communication nodes $200_1$ and $200_2$ are connected to a first communication node $100_1$. Second communication nodes $200_3$ and $200_4$ are connected to a first communication node $100_2$. Second communication nodes $200_5$ and $200_6$ are connected to a first communication node $100_3$. A second communication node $200_7$ is connected to a first communication node $100_4$.

The second communication node $200m$ can communicate with other communication node(s) (the first communication node(s) or other second communication node(s)) via the first communication node which is connected to the second communication node $200m$. It is preferable that the amount of data transmitted between the second communication node $200m$ and the first communication node $100n$ is less than that of data transmitted between the first communication nodes $100x$.

According to the communication system of the present embodiment, it is possible to increase the communication capacity by enabling the first communication nodes $100x$ to perform high speed communication and bulk data communication.

According to the communication system of the present embodiment, it is possible to reduce length of the electric cables connecting the first communication nodes $100x$ and the second communication nodes $200y$ by connecting the second communication nodes $200y$ to the closest first communication nodes $100x$, respectively. As a result, it is possible to reduce the manufacturing cost of the communication system. A lower speed communication and reduced capacity communication may be performed between the first communication node $100n$ and the second communication node $200m$ than those performed among the first communication nodes $100x$. For example, the first communication node $100n$ and the second communication node $200m$ are connected by a communication bus (hereinafter referred to as a "second bus $250_m$"). For example, the second communication node $200_1$ and the first communication node $100_1$ are connected by a second bus $250_1$. For example, the second communication node $200_2$ and the first communication node $100_1$ are connected by a second bus $250_2$. For example, the second communication node $200_3$ and the first communication node $100_2$ are connected by a second bus $250_3$. For example, the second communication node $200_4$ and the first communication node $100_2$ are connected by a second bus $250_4$. For example, the second communication node $200_5$ and the first communication node $100_3$ are connected by a second bus $250_5$. For example, the second communication node $200_6$ and the first communication node $100_3$ are connected by a second bus $250_6$. For example, the second communication node $200_7$ and the first communication node $100_4$ are connected by a second bus $250_7$. For example, the first communication node and the second communication node may be connected by a CAN or a LIN that forms a communication network therebetween.

Otherwise, for example, the first communication node $100n$ and the second communication node $200m$ may be connected by an electric cable (not shown). Further, there may be a second communication node which is connected to the first communication node only by an electric cable, if it is not necessary for the second communication node to communicate with the first communication node. It is possible to further reduce the manufacturing cost of the communication system by realizing the low speed data communication and/or reduced amount data communication between the first communication node and the second communication node.

<The First Communication Node>

The first communication node $100n$ performs at least either one of a transmission of a signal to or a receipt of a signal from the second communication node $200m$ connected to the first communication node $100n$. The first communication node $100n$ performs at least either one of a transmission of a signal to or a receipt of a signal from another first communication node connected to the first communication node $100n$.

The first communication node $100n$ detects the second communication node $200m$ connected to the first communication node $100n$.

For example, in a case where the first communication node $100n$ and the second communication node $200m$ are connected via a communication wire, the first communication node $100n$ may detect the second communication node $200m$ by performing a communication. For example, the first communication node $100n$ may detect and identify the second communication node based on a message (connection information) which is to be transmitted from the second communication node $200m$.

Otherwise, in a case where the first communication node $100n$ and the second communication node $200m$ are connected by the electric cable, the first communication node $100n$ may detect the second communication node $200m$ based on a variation of voltage applied to the electric cable or a variation of current flowing through the electric cable. For example, in a case where there is a hardware configuration in which voltage applied to an electric cable decreases when the first communication node $100n$ and the second communication node $200m$ are connected by the electric cable, the first communication node $100n$ may detect a connection of the second communication node $200m$ based on a decrease of voltage applied to the electric cable. The first communication node $100n$ may detect the connection of the second communication node $200m$ based on a current flowing through the electric cable.

The first communication node $100n$ has a message transmission and receipt request table. The message transmission and receipt request table includes information which represents whether the message transmitted and received between the first communication node $100n$ and the second communication node $200m$ is a receipt request, a transmission request or neither of the receipt request nor the transmission request. The receipt request is a type of a request representing that the second communication node $200m$ receives data from the first communication node $100n$. The transmission request is a type of a request representing that the second communication node $200m$ transmits data to the first communication node $100n$. In the message transmission and receipt request table, the information representing the receipt request, the transmission request or neither of the receipt request nor the transmission request is stored for each of the messages transmitted and received between the first communication node $100n$ and the second communication node $200m$. Further, in the message transmission and receipt request table, the information representing the receipt request, the transmission request or neither of the receipt request nor the transmission request is stored for each of the second communication nodes $200y$ connected to the first communication node $100n$.

The first communication node $100n$ may further store information representing the receipt request, the transmission request or neither of the receipt request nor the transmission request with regard to the second communication node which has a possibility to be connected to the first communication node and with regard to the message to be transmitted and received between the first communication node $100n$ and the second communication node $200m$ in the message transmission and receipt request table.

Otherwise, the message transmission and receipt request table may include information representing whether the message to be transmitted and received in the communication system is the receipt request, the transmission request or neither of the receipt request nor the transmission request for each of the second communication nodes $200y$ included in the communication system.

FIG. 2 is a diagram illustrating an example of the message transmission and receipt request table held by the first communication node $100n$.

In FIG. 2, the message transmission and receipt request table held by the first communication node $100_1$ is illustrated, for example. As illustrated in FIG. 2, the message transmission and receipt request table includes information which represents whether the message transmitted and received between the first communication node $100_1$ and the second communication nodes $200_1$, $200_2$ and $200_3$ is the receipt request, the transmission request or neither of the receipt request nor the transmission request. In the message transmission and receipt request table, the information representing the receipt request, the transmission request or neither of the receipt request nor the transmission request is stored for each of the messages transmitted and received between the first communication node $100_1$ and the second communication nodes $200_1$, $200_2$ and $200_3$. Further, in the message transmission and receipt request table, the information representing the receipt request, the transmission request or neither of the receipt request nor the transmission request is stored for each of the second communication nodes $200_1$, $200_2$ and $200_3$ connected to the first communication node $100_1$. For example, the message has a unique identification (ID). Since each of the messages includes the unique ID (message ID), the first communication node $100n$ can perform transmission settings which will be described later without duplication or overlapping with another first communication node.

As illustrated in FIG. 1, the second communication nodes $200_1$ and $200_2$ are connected to the first communication node $100_1$, but the second communication node $200_3$ is not connected to the first communication node $100_1$. Accordingly, the second communication node $200_3$ is included in the message transmission and receipt request table as the communication node which has the possibility to be connected to the first communication node $100_1$.

In FIG. 2, the transmission request is represented as "transmission", the receipt request is represented as "receipt" and the information which represents neither of the receipt request nor the transmission request is represented as "neither".

As illustrated in FIG. 2, the second communication node $200_1$ requests and transmits a message identified by a message ID "aa" to the first communication node $100_1$. Accordingly, the message identified by the message ID "aa" is transmitted from the second communication node $200_1$ to the first communication node $100_1$. As illustrated in FIG. 2, the second communication node $200_1$ does not perform the transmission request or the receipt request with regard to a message identified by a message ID "bb" against the first communication node $100_1$. Accordingly, the second communication node $200_1$ does not transmit the message identified by the message ID "bb" to the first communication node $100_1$ or receive the message identified by the message ID "bb" from the first communication node $100_1$. As illustrated in FIG. 2, the second communication node $200_1$ requests receiving a message identified by a message ID "cc" from the first communication node $100_1$. Accordingly, the second communication node $200_1$ receives the message identified by the message ID "cc" from the first communication node $100_1$. As illustrated in FIG. 2, the second communication node $200_1$ does not perform the transmission request or the receipt request with regard to a message identified by a message ID "dd" against the first communication node $100_1$. Accordingly, the second communication node $200_1$ does not transmit the message identified by the message ID "dd" to the first communication node $100_1$ or receive the message identified by the message ID "dd" from the first communication node $100_1$.

As illustrated in FIG. 2, the second communication node $200_2$ requests receiving the messages identified by the message IDs "aa", "bb" and "cc" from the first communication node $100_3$. Accordingly, the second communication node $200_2$ receives the messages identified by the message IDs "aa", "bb" and "cc" from the first communication node $100_1$. As illustrated in FIG. 2, the second communication node $200_2$ does not perform the transmission request or the receipt request with regard to a message identified by a message ID "dd" against the first communication node $100_1$. Accordingly, the second communication node $200_2$ does not transmit the message identified by the message ID "dd" to the first communication node $100_1$ or receive the message identified by the message ID "dd" from the first communication node $100_1$.

As illustrated in FIG. 2, the second communication node $200_3$ does not perform the transmission request or the receipt request with regard to messages identified by a message IDs "aa", "bb", "cc" and "dd" against the first communication node $100_1$. Accordingly, the second communication node $200_3$ does not transmit the messages identified by the message IDs "aa", "bb", "cc" and "dd" to the first communication node $100_1$ or receive the messages identified by the message IDs "aa", "bb", "cc" and "dd" from the first communication node $100_1$.

Hereinafter, the information representing the transmission request, the information representing the receipt request and the information representing neither of the receipt request nor the transmission request are referred to as a "message transmission and receipt request information". The transmission request and the receipt request are sent from the second communication node $200m$ to the first communication node $100n$. These three information data are sent from the second communication node $200m$ to the first communication node $100n$.

The first communication node $100n$ extracts the message transmission and receipt request information from the message transmission and receipt request table which is held by the first communication node $100n$. The message transmission and receipt request information are extracted with regard to the second communication node $200m$ which is detected by the first communication node $100n$. The message transmission and receipt request information are extracted with regard to the second communication node $200m$ included in the message transmission and receipt request table which is held by the first communication node $100n$. The message transmission and receipt request information are extracted for each of the messages transmitted or received between the first communication node $100n$ and the second communication node $200m$. The message transmission and receipt request information are extracted based on the information representing the receipt request, the information representing the transmission request and the information representing neither of the receipt request nor the transmission request stored in the message transmission and receipt request table.

The first communication node $100n$ performs an operation setting of the first communication node $100n$ based on the extracted message transmission and receipt request information corresponding to the second communication node. For example, the first communication node $100n$ performs a transmission setting, a receipt setting or a no communication setting. If the no communication setting is performed, neither of the transmission setting nor the receipt setting is performed.

For example, herein, a case where the first communication node $100_1$ has the message transmission and receipt request table as illustrated in FIG. 2 is described.

For example, according to the communication system as illustrated in FIG. 1, the second communication nodes $200_1$ and $200_2$ are connected to the first communication node $100_1$. The first communication node $100$; performs the operation setting of the first communication node $100_1$, i.e. the transmission setting, the receipt setting or the no communication setting, based on the message transmission and receipt request information for each of the messages of the second communication nodes $200_1$, $200_2$ and $200_3$. The first communication node $100_1$ performs the operation setting for each of the second communication node $200_1$, $200_2$ and $200_3$.

FIG. 3 is a diagram illustrating an example of a transmission and receipt setting of the first communication node $100_1$.

As illustrated in FIG. 2, with regard to the message identified by the message ID "aa", the second communication node $200_1$ performs the transmission request, and the second communication node $200_2$ performs the receipt request. Accordingly, it is preferable for the first communication node $100_1$ to perform the transmission setting according to which the first communication node $100_1$ receives the message identified by the message ID "aa" which is transmitted from the second communication node $200_1$ in accordance with the transmission request performed by the second communication node $200_1$, and transmits the received message to another first communication node $100n$ such as the first communication node $100_2$, $100_3$ or $100_4$. Further, it is preferable for the communication node $100_1$ to perform the transmission setting according to which the first communication node $100_1$ transmits the message identified by the message ID "aa" in accordance with the receipt request performed by the second communication node $200_2$. Accordingly, the first communication node $100_1$ performs the transmission setting with regard to the message identified by the message ID "aa". The transmission setting is represented as "transmission" in FIG. 3.

With regard to the message identified by the message ID "bb", the second communication node $200_1$ performs neither of the receipt request nor the transmission request, and the second communication node $200_2$ performs the receipt request. Since the second communication node $200_1$ performs neither of the receipt request nor the transmission request with regard to the message identified by the message ID "bb", it is preferable for the first communication node $100_1$ to perform the no communication setting. It is preferable for the first communication node $100_1$ to perform the receipt setting according to which the first communication node $100_1$ receives the message identified by the message ID "bb" from another first communication node $100n$ such as the first communication node $100_2$, $100_3$ or $100_4$ so that the first communication node $100_1$ can transmit the message identified by the message ID "bb" to the second communication node $200_2$ in accordance with the receipt request performed by the second communication node $200_2$. Accordingly, the first communication node $100_1$ performs the receipt setting with regard to the message identified by the message ID "bb". The receipt setting is represented as "receipt" in FIG. 3.

With regard to the message identified by the message ID "cc", the second communication nodes $200_1$ and $200_2$ perform the receipt request. It is preferable for the first communication node $100_1$ to perform the receipt setting according to which the first communication node $100_1$ receives the message identified by the message ID "cc" from another first communication node $100n$ such as the first communication node $100_2$, $100_3$ or $100_4$ so that the first communication node $100_1$ can transmit the message identified by the message ID "cc" to the second communication node $200_1$ in accordance with the receipt request performed by the second communication node $200_1$. This is because there is no second communication node which performs the transmission request with regard to the message identified by the message ID "cc". It is preferable for the first communication node $100_1$ to perform the receipt setting according to which the first communication node $100_1$ receives the message identified by the message ID "cc" from another first communication node $100n$ such as the first communication node $100_2$, $100_3$ or $100_4$ so that the first communication node $100_1$ can transmit the message identified by the message ID "cc" to the second communication node $200_2$ in accordance with the receipt request performed by the second communication node $200_2$. Accordingly, the first communication node $100_1$ performs the receipt setting with regard to the message identified by the message ID "cc". The receipt setting is represented as "receipt" in FIG. 3.

With regard to the message identified by the message ID "dd", the second communication nodes $200_1$ and $200_2$ perform neither of the receipt request nor the transmission request. Since the second communication node $200_1$ performs neither of the receipt request nor the transmission request with regard to the message identified by the message ID "dd", it is preferable for the first communication node $100_1$ to perform the no communication setting. Similarly, since the second communication node $200_2$ performs neither of the receipt request nor the transmission request with regard to the message identified by the message ID "dd", it is preferable for the first communication node $100_1$ to perform the no communication setting. Accordingly, the first communication node $100_1$ performs the no communication setting with regard to the message identified by the message ID "dd". The no communication setting is represented as "no communication" in FIG. 3. Hereinafter, with regard to the first communication node $100n$, information representing the transmission setting, the receipt setting and the no communication setting for each of the messages is referred to as a "transmission and receipt setting information".

The first communication node $100_1$ sends the transmission and receipt setting information to other first communication nodes $100_2$, $100_3$ and $100_4$.

The first communication node $100_1$ receives the transmission and receipt setting information from other first communication nodes $100_2$, $100_3$ and $100_4$. The first communication node $100_1$ generates a transmission and receipt setting information table based on the transmission and receipt setting information of other first communication nodes $100_2$, $100_3$ and $100_4$ and the transmission and receipt setting information of the first communication node $100_1$. The first communication node $100_1$ determines consistency of the transmission and receipt setting information of other first communication nodes $100_2$, $100_3$ and $100_4$ and the transmission and receipt setting information of the first communication node $100_1$ for each of the messages. In other words, the first communication node $100_1$ determines whether there is a discrepancy among the transmission and receipt setting information of other first communication nodes $100_2$, $100_3$ and $100_4$ and the transmission and receipt setting information of the first communication node $100_1$ for each of the messages.

FIG. 4 is a diagram illustrating an example of the transmission and receipt setting information table generated by the first communication node $100_1$. The transmission and receipt setting information table includes the transmission and receipt setting information which is set by the first communication node $100_1$ and the transmission and receipt setting information which is set by the first communication nodes $100_2$, $100_3$ and $100_4$. For example, the information representing the transmission setting, the receipt setting or the no communication which is set by the first communication nodes $100_1$, $100_2$, $100_3$ and $100_4$ for each of the message IDs is included in the transmission and receipt setting information table. The first communication node $100_1$ determines consistency of the transmission and receipt setting information of the first communication nodes $100_1$, $100_2$, $100_3$ and $100_4$ for each of the messages based on the transmission and receipt setting information table.

With regard to an example as illustrated in FIG. 4, the first communication node $100_1$ determines that the consistency is maintained with regard to the message identified by the message ID "aa", because the first communication nodes $100_3$ and $100_4$ can receive the message transmitted from the first communication node $100_1$.

The first communication node $100_1$ determines that the consistency is maintained with regard to the message identified by the message ID "bb", because the first communication nodes $100_1$, $100_2$ and $100_4$ can receive the message transmitted from the first communication node $100_3$.

With regard to the message identified by the message ID "cc", the transmission and receipt setting information set by the first communication nodes $100_1$, $100_2$ $100_4$ represents the receipt setting, but there no first communication node to which the message identified by the message ID "cc" is transmitted. Accordingly, the first communication node $100_1$ determines that the consistency is not maintained with regard to the message identified by the message ID "cc".

With regard to the message identified by the message ID "dd", the transmission and receipt setting information set by the first communication node $100_4$ represents the receipt setting, but the transmission and receipt setting information set by the two first communication nodes $100_2$ and $100_3$ represents the transmission setting. Accordingly, the first communication node $100_1$ determines that the consistency is not maintained with regard to the message identified by the message ID "dd".

In a case where the first communication node $100_1$ determines that the consistency is maintained with regard to all of the messages, the first communication node $100_1$ starts to transmit a control message. In a case where the first communication node $100_1$ determines that the consistency is not maintained, the first communication node $100_1$ restarts the processes as described above from the beginning of generating transmission and receipt setting information. As a result, another transmission and receipt setting information is generated.

Figure 5:
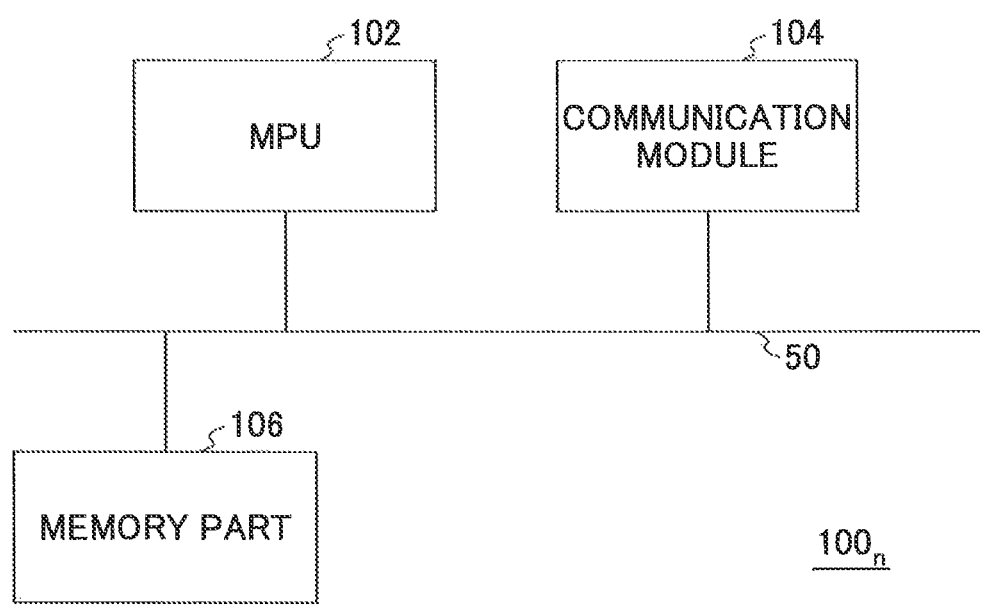
FIG. 5 is a diagram illustrating a first communication node.

FIG. 5 is a diagram illustrating the first communication node $100n$. FIG. 5 mainly illustrates a hardware configuration of the first communication node $100n$.

The first communication node $100n$ includes a Micro-Processing Unit (MPU) 102. The MPU 102 performs the all controls of the first communication node $100n$.

The first communication node $100n$ includes a communication module 104. The communication module 104 performs a communication with other communication modules included in other first communication nodes $100x$. For example, the communication module 104 performs the communication in accordance with the first communication protocol. The communication module 104 performs a communication with the second communication node $200m$ connected with the first communication node $100n$. A network such as CAN or LIN, for example, may be formed between the first communication node $100n$ and the second communication node $200m$.

The first communication node $100n$ includes a memory part 106. The memory part 106 stores a computer program which causes the MPU 102 to perform a function of the first communication node $100n$. The memory part 106 further stores the message transmission and receipt request.

The MPU 102, the communication module 104 and the memory part 106 are connected with each other by a bus 50.

<Function of the First Communication Node>

Figure 6:
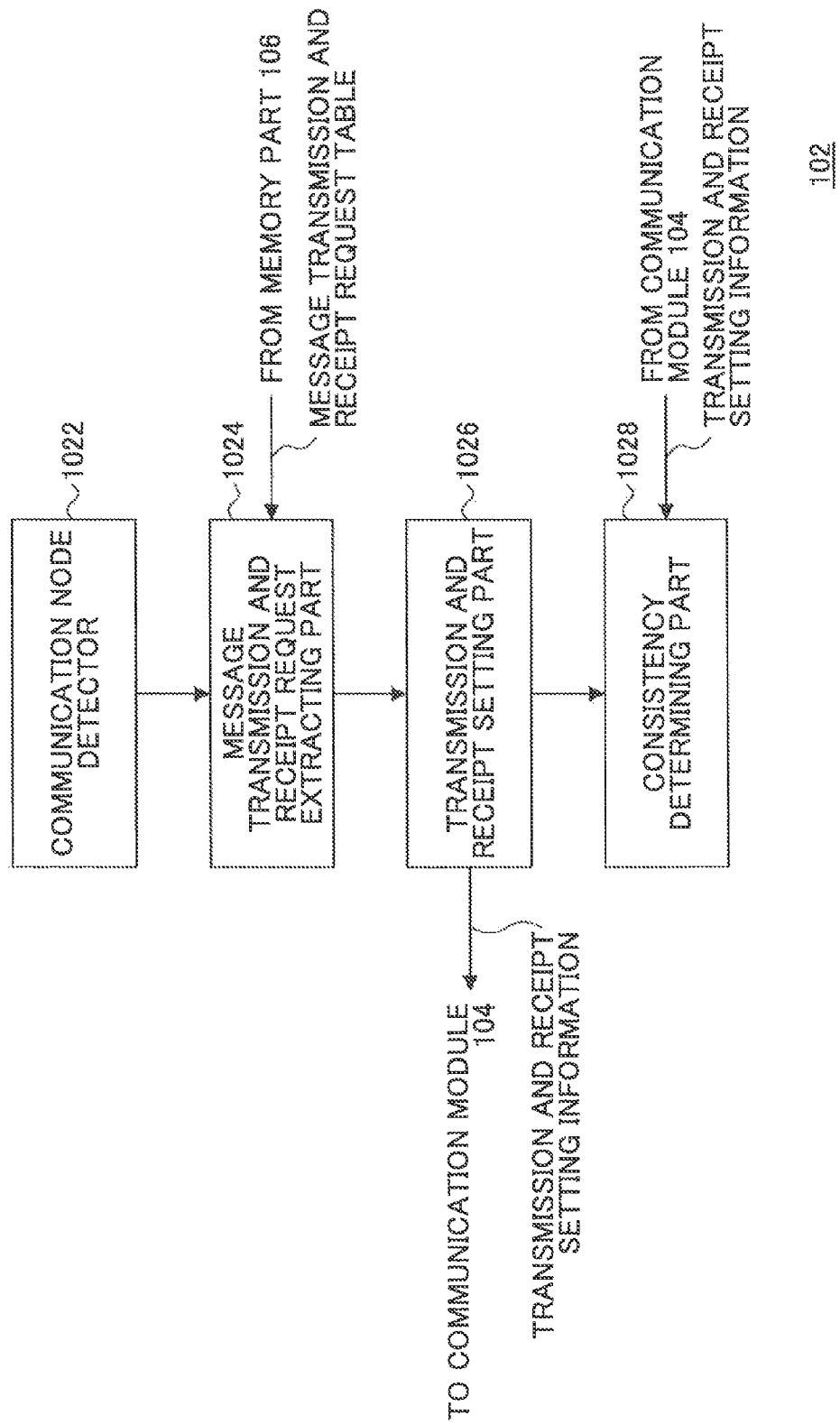
FIG. 6 is a diagram illustrating the function of the first communication node.

FIG. 6 is a diagram illustrating the function of the first communication node $100n$. FIG. 6 illustrates functions mainly executed by the MPU 102.

The first communication node $100n$ includes a communication node detector 1022. The communication node detector 1022 detects the second communication node $200m$ connected to the first communication node $100n$. For example, the communication node detector 1022 may detect the second communication node $200m$ by communicating with the second communication node 200*m*, in a case where the first communication node 100*n* and the second communication node 200*m* are connected by the communication wire. Otherwise, in a case where the first communication node 100*n* and the second communication node 200*m* are connected by the electric cable, the communication node detector 1022 may detect the second communication node 200*m* based on variation of voltage applied to the electric cable or variation of current flowing through the electric cable. The communication node detector 1022 inputs information representing the detected second communication node to a message transmission and receipt request extracting part 1024.

The first communication node 100*n* includes the message transmission and receipt request extracting part 1024. The message transmission and receipt request extracting part 1024 is connected to the communication node detector 1022. The message transmission and receipt request extracting part 1024 references the message transmission and receipt request table, such as the one illustrated in FIG. 2, stored in the memory part 106 and extracts the transmission and receipt request information corresponding to the second communication node input from the communication node detector 1022.

For example, the message transmission and receipt request extracting part 1024 of the first communication node 100$_1$ extracts information corresponding to the second communication nodes 200$_1$ and 200$_2$ from the message transmission and receipt request table based on the information representing the second communication nodes 200$_1$ and 200$_2$ input from, the communication node detector 1022. The message transmission and receipt request extracting part 1024 inputs the extracted message transmission and receipt request information to a transmission and receipt setting part 1026.

The first communication node 100*n* includes the transmission and receipt setting part 1026. The transmission and receipt setting part 1026 is connected to the message transmission and receipt request extracting part 1024. The transmission and receipt setting part 1026 performs the transmission setting, the receipt setting or the no communication setting for each of the messages with regard to the first communication node 100*n* based on the transmission and receipt request information input from the message transmission and receipt request extracting part 1024.

For example, the transmission and receipt setting part 1026 performs the transmission setting, the receipt setting or the no communication setting for each of the messages with regard to the first communication node 100*n*. The transmission setting, the receipt setting or the no communication setting represents the operation of the first communication node 100*n*. The transmission and receipt setting part 1026 performs the transmission setting based on the information representing the transmission request with regard to each of the messages of the second communication node connected to the first communication node 100*n*. The transmission and receipt setting part 1026 performs the receipt setting based on the information representing the receipt request with regard to each of the messages of the second communication node connected to the first communication node 100*n*. The transmission and receipt setting part 1026 performs the no communication setting based on the information representing neither of the receipt request nor the transmission request with regard to each of the messages of the second communication node connected to the first communication node 100*n*. The transmission and receipt setting part 1026 inputs the transmission and receipt setting information to the communication module 104 and a consistency determining part 1028. The transmission and receipt setting information includes the transmission setting, the receipt setting and no communication setting of the first communication node 100*n*. The transmission setting, the receipt setting and no communication setting are set for each of the messages. The communication module 104 transmits the transmission and receipt setting information input from the transmission and receipt setting part 1026 to other first communication nodes.

The first communication node 100*n* includes the consistency determining part 1028. The consistency determining part 1028 is connected to the transmission and receipt setting part 1026. The transmission and receipt setting information transmitted from other first communication nodes is input to the consistency determining part 1028

The consistency determining part 1028 generates the transmission and receipt setting information table such as the one illustrated in FIG. 4 based on the transmission and receipt setting information input from the transmission and receipt setting part 1026 and the transmission and receipt setting information input from other first communication nodes via the communication module 104. The consistency determining part 1028 determines the consistency of the transmission and receipt setting for each of the messages based on the transmission and receipt setting information table. In particular, the consistency determining part 1028 determines, for each of the messages, whether there is a single (only one) first communication node which is set to the transmission setting. The consistency determining part 1028 determines that the consistency is maintained if there is a single (only one) first communication node which is set to the transmission setting. The consistency determining part 1028 determines that the consistency is not maintained if there is no first communication node which is set to the transmission setting. Further, the consistency determining part 1028 determines that the consistency is not maintained if there is more than two first communication nodes that are set to the transmission setting. However, in a case where there is no first communication node which is set to the transmission setting, the consistency determining part 1028 determines that the consistency is maintained if there is no first communication node which is set to the receipt setting.

In a case where the consistency determining part 1028 determines that the consistency is maintained, the first communication node 100*n* may start to transmit the control message. In a case where the consistency determining part 1028 determines that the consistency is not maintained, the first communication node 100*n* may restart a process from the beginning of detecting the second communication node 200*m* connected to the first communication node 100*n*. In a case where the consistency determining part 1028 determines that the consistency is not maintained, the first communication node 100*n* may restart a process from the beginning of generating the transmission and receipt setting information with regard to the first communication node 100*n*.

<The Second Communication Node>

The second communication node 200*m* performs a communication by transmitting and receiving a signal with the first communication node 100*n* connected to the second communication node 200*m*.

In a case where the second communication node 200*m* is connected to the first communication node 100*n* via the communication wire, the second communication node 200*m* transmits a message to the first communication node 100*n* when the second communication node 200*m* is detected by the first communication node 100*n*.

Figure 7:
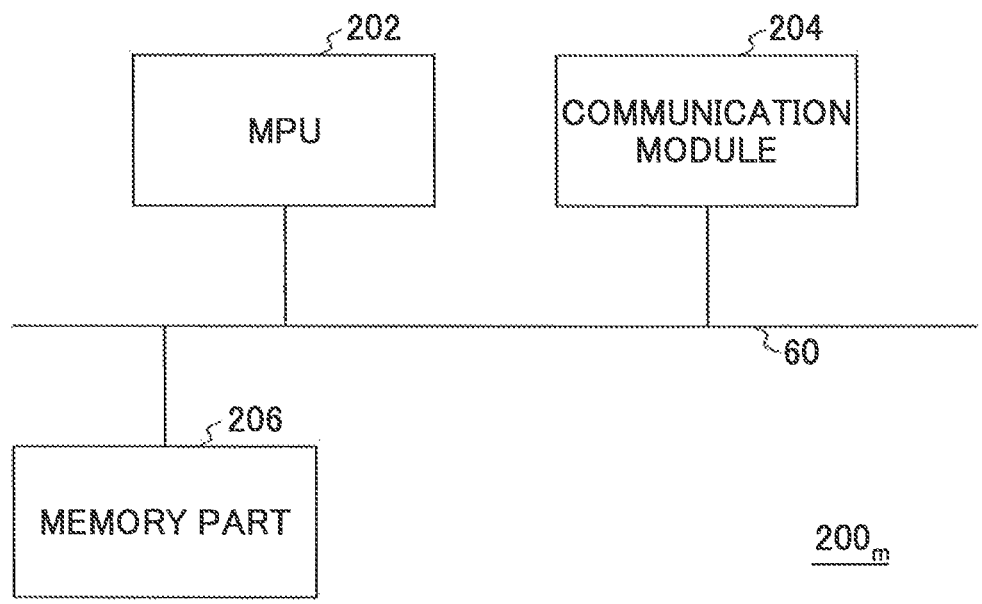
FIG. 7 is a diagram illustrating a second communication node.

FIG. 7 is a diagram illustrating the second communication node 200m. FIG. 7 mainly illustrates a hardware configuration of the second communication node 200m.

The second communication node 200m includes an MPU 202. The MPU 202 performs the all controls of the second communication node 200m.

The second communication node 200m includes a communication module 204. The communication module 204 performs a communication with the communication modules 104 included in the first communication node 100n. For example, the communication module 204 performs the communication in accordance with the second communication protocol. The communication module 204 may form a network such as CAN or LIN between the second communication node 200m and the first communication node 100n connected to the second communication node 200m.

The second communication node 200m includes a memory part 206. The memory part 206 stores a computer program which causes the MPU 202 to perform a function of the second communication node 200m.

The MPU 202, the communication module 204 and the memory part 206 are connected with each other by a bus 60.

<Function of the Second Communication Node>

Figure 8:
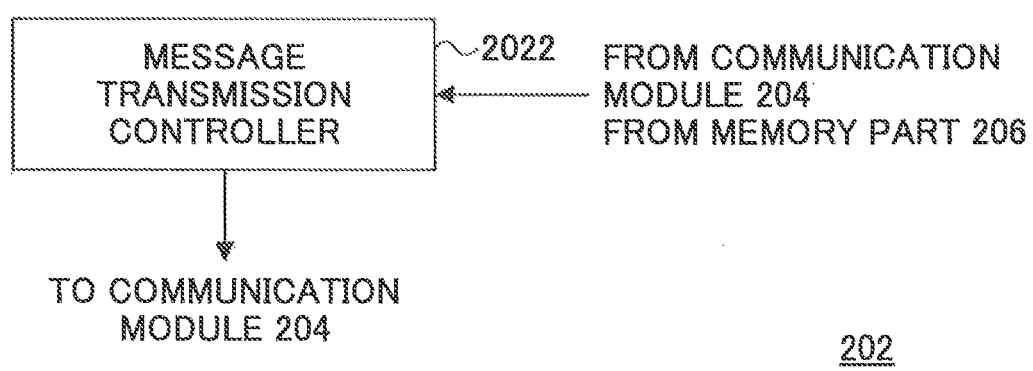
FIG. 8 is a diagram illustrating functions of a second communication node.

FIG. 8 is a diagram illustrating functions of the second communication node 200m. FIG. 8 illustrates functions mainly executed by the MPU 202.

The second communication node 200m includes a message transmission controller 2022. The message transmission controller 2022 performs a control in order to transmit a designated message when the second communication node 200m is detected by the first communication node 100n connected to the second communication node 200m.

For example, a designated message is input to the second communication node 200m from the first communication node 100n via the communication module 204. The message transmission controller 2022 responds to the designated message, obtains a message stored in the memory part 206, and transmits the message to the first communication node 100n via the communication module 204.

The second communication node 200m performs a transmission and receipt of a message in accordance with a setting of transmission and receipt after finishing the setting of transmission and receipt and determining that the consistency is maintained.

<An Operation of the Communication System>

Figure 9:
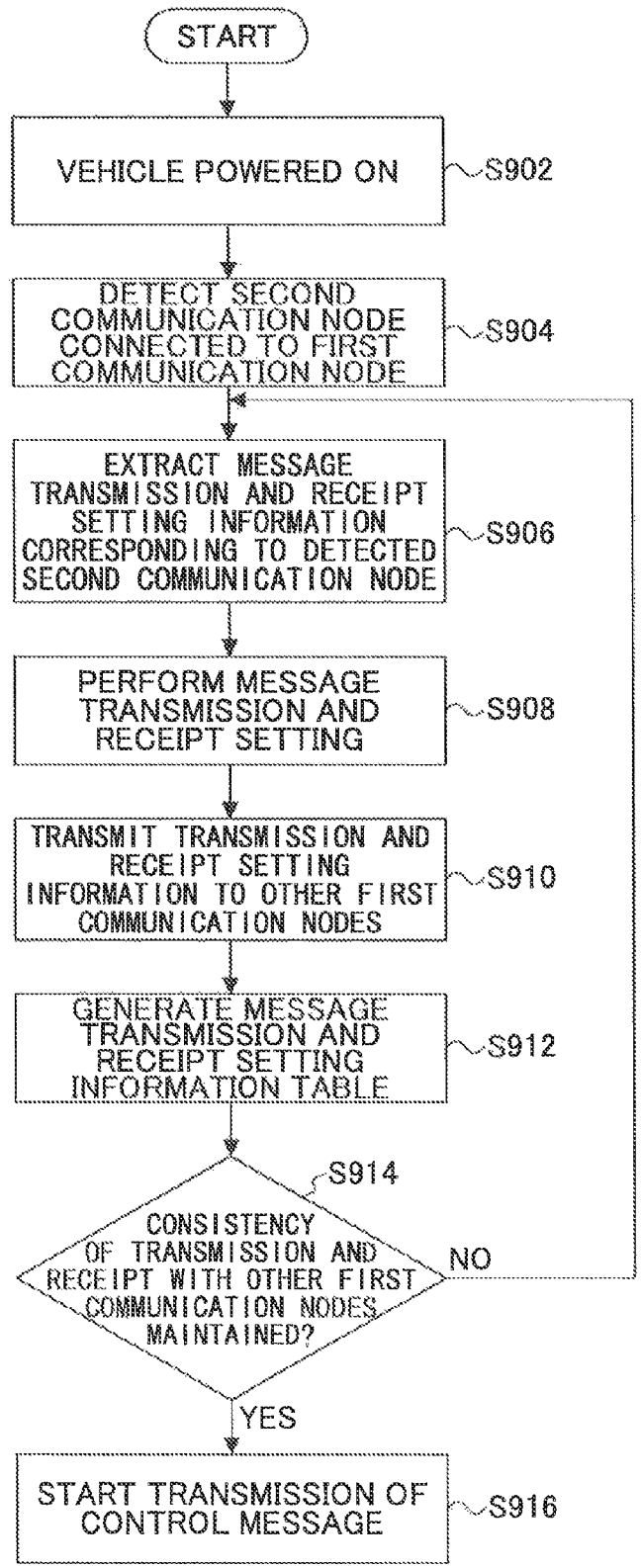
FIG. 9 is a flowchart illustrating an example of the operation of the communication system.

FIG. 9 is a diagram illustrating an example of the operation of the communication system.

FIG. 9 mainly illustrates the operation of the first communication node 100n.

A vehicle on which the communication system is mounted is powered on (step S902). For example, an engine of the vehicle is powered on.

The first communication node 100n detects the second communication node 200m connected to the first communication node 100n (step S904). For example, the communication node detector 1022 may detect the second communication node 200m by communicating with the second communication node 200m, in a case where the first communication node 100n and the second communication node 200m are connected by the communication wire. Otherwise, in a case where the first communication node 100n and the second communication node 200m are connected by the electric cable, the communication node detector 1022 may detect the second communication node 200m based on variation of voltage applied to the electric cable or variation of current flowing through the electric cable.

The first communication node 100n refers the message transmission and receipt request table and extracts the message transmission and receipt request information corresponding to information representing the second communication node detected at step S904 (step S906). For example, the message transmission and receipt request extracting part 1024 extracts the message transmission and receipt request information corresponding to the second communication node 200m from the message transmission and receipt request table as illustrated in FIG. 2 based on information representing the second communication node 200m input from the communication node detector 2022.

The first communication node 100n performs the transmission and receipt setting of the message (step S908). For example, the transmission and receipt setting part 1026 the transmission setting, the receipt setting or the no communication setting for each of the messages with regard to the first communication node 100n. The transmission setting, the receipt setting or the no communication setting represents the operation of the first communication node 100n. The transmission and receipt setting part 1026 performs the transmission setting based on the information representing the transmission request with regard to each of the message transmitted and received between the first communication node and the second communication node connected to the first communication node 100n. The transmission and receipt setting part 1026 performs the receipt setting based on the information representing the receipt request with regard to each of the message transmitted and received between the first communication node and the second communication node connected to the first communication node 100n. The transmission and receipt setting part 1026 performs the no communication setting based on the information representing neither of the receipt request nor the transmission request with regard to each of the messages transmitted and received between the first communication node and the second communication node connected to the first communication node 100n.

The first communication node 100n transmits the transmission and receipt setting information including the information of the transmission setting, receipt setting or the no communication setting of the first communication node 100n to other first communication nodes (step S910). The transmission and receipt setting part 1026 inputs the transmission and receipt setting information to the communication module 104. The transmission and receipt setting information includes the transmission setting, the receipt setting and no communication setting of the first communication node 100n. The transmission setting, the receipt setting and no communication setting are set for each of the messages. The communication module 104 transmits the transmission and receipt setting information to other first communication nodes.

The first communication node 100n generates the transmission and receipt setting information table based on the transmission and receipt setting information of other first communication nodes and the transmission and receipt setting information of the first communication node 100n (step S912). For example, the consistency determining part 1028 generates the transmission and receipt setting information table based on the transmission and receipt setting information based on the transmission and receipt setting information of other first communication nodes and the transmission and receipt setting information of the first communication node 100n.

The first communication node 100n determines whether the consistency of the transmission and receipt is maintained between the first communication node 100*n* and other first communication node (step S914). For example, the consistency determining part 1028 determines the consistency of the transmission and receipt setting for each of the messages based on the transmission and receipt setting information table. In particular, the consistency determining part 1028 determines, for each of the messages, whether there is a single (only one) first communication node which is set to the transmission setting. The consistency determining part 1028 determines that the consistency is maintained if there is a single (only one) first communication node which is set to the transmission setting. The consistency determining part 1028 determines that the consistency is not maintained if there is no first communication node which is set to the transmission setting. Further, the consistency determining part 1028 determines that the consistency is not maintained if there is more than two first communication nodes that are set to the transmission setting.

If the consistency determining part 1028 determines that the consistency is maintained (S914: YES), the first communication node 100*n* starts to transmit the control message (step S916).

If the consistency determining part 1028 determines that the consistency is not maintained (S914: NO), the first communication node 100*n* returns to step S906. For example, the first communication node 100*n* restarts the processes as described above from the beginning of extracting the transmission and receipt request information corresponding to the second communication node detected at step S902 by referring to the message transmission and receipt request table.

The MPU 102 executes the processes from step S904 to step S914 in accordance with the computer program. The computer program which causes the MPU 102 to function as the first communication node 100*n* is provided in a state where the computer program is stored in a storing medium such as a flexible disk, a CD-ROM, a memory card or the like. Otherwise, the computer program may be downloaded from a communication network. If the storing medium is inserted into an auxiliary storage of a computer, the computer program stored in the storing medium is read. The MPU 102 extends the read computer program into the memory part 106 and executes the processes. The computer program causes the computer to execute the processes from step S904 to step S914 as illustrated in FIG. 9. Otherwise, the computer program may execute at least a part of the steps, for example.

Since the second communication node includes the sensor or the actuator, the second communication node may be disposed in various places in the vehicle. The places are different depending on types or grades of the vehicle. This is because a shape of the vehicle, a position of a steering wheel or the like is different depending on the types or the grades of the vehicle. Since the places in which the second communication nodes are disposed are different depending on the type of the vehicle, the messages transmitted and received between the second communication node and the first communication node connected to the second communication node vehicle may be different depending on the types or the grades of the vehicle.

According to a conventional communication system mounted of a vehicle, it is necessary to perform a transmission and receipt setting of messages transmitted and received between nodes corresponding to the first communication nodes for each of the types or grades of the vehicle. In particular, a transmission function and a receipt function are set by designing a computer program which is installed into the nodes corresponding to the first communication nodes for each of the types or the grades of the vehicle. However, it is not preferable to design the computer program for each of the types and the grades of the vehicle, because this leads to an increase of a manufacturing cost.

According to the communication system of the present embodiment, the first communication node 100*n* detects the second communication node 200*m* connected to the first communication node 100*n* when the vehicle is powered on. The first communication node 100*n* performs the transmission setting, the receipt setting or the no communication setting based on the detected second communication node 200*m* for each of the messages. The first communication node 100*n* determines whether the consistency is maintained based on the transmission setting, the receipt setting or the no communication setting of the first communication node 100*n* and the transmission setting, the receipt setting or the no communication setting of other first communication nodes.

In a case where at least one of the first communication nodes and the second communication nodes included in the communication system is changed, it is possible to dynamically change the message transmission and receipt setting of the first communication node by executing the processes as described above. Accordingly, it is possible to correspond to the change without changing the computer program of the first communication node and the second communication node.

In a case where the places of the second communication nodes are different depending on the types or the grades of the vehicle, it is possible to connect the second communication node 200*m* to the closest first communication node 100*n*. Accordingly, it is possible to reduce the manufacturing cost of the communication system.

<Variation>

According to the embodiment as described above, the first communication node 100*n* has a message transmission and receipt request table. The message transmission and receipt request table includes information which represents whether the message transmitted and received between the first communication node 100*n* and the second communication node 200*m* is the receipt request, the transmission request or neither of the receipt request nor the transmission request. The receipt request is a type of a request representing that the second communication node 200*m* requests receiving data from the first communication node 100*n*. The transmission request is a type of a request representing that the second communication node 200*m* transmits data to the first communication node 100*n*. In the message transmission and receipt request table, the information representing the receipt request, the transmission request or neither of the receipt request nor the transmission request is stored for each of the messages transmitted and received between the first communication node 100*n* and the second communication node 200*m*. Further, in the message transmission and receipt request table, the information representing the receipt request, the transmission request or neither of the receipt request nor the transmission request is stored for each of the second communication nodes 200*y* connected to the first communication node 100*n*.

According to the variation, the first communication node 100*n* has a message transmission and receipt request table. The message transmission and receipt request table includes information which represents whether the message transmitted and received between the first communication node 100*n* and the second communication node 200*m* is the receipt request, the transmission request or neither of the receipt request nor the transmission request. In the message transmission and receipt request table, the information representing the receipt request, the transmission request or neither of the receipt request nor the transmission request is stored for each of the data transmitted and received between the first communication node 100$n$ and the second communication node 200$m$. Further, in the message transmission and receipt request table, the information representing the receipt request, the transmission request or neither of the receipt request nor the transmission request is stored for each of the second communication nodes 200$y$ connected to the first communication node 100$n$. Herein, the data may be a function of the vehicle. For example, the data may be a measured value of a meter or control data of an air conditioner. The message may include plural data corresponding to the functions of the vehicle. In this case, for example, the first communication node 100$n$ has a data transmission and receipt request table instead of the message transmission and receipt request table. The data transmission and receipt request table is a table obtained by replacing the message ID to a data ID in the message transmission and receipt request table as illustrated in FIG. 2. The data includes a unique identification (the data ID). Since each of the data includes the unique ID (the data ID), the first communication node 100$n$ can perform transmission setting which will be described later without duplication or overlapping with another first communication node.

Further, the first communication node 100$n$ includes a message data correspondence table which represents a correspondence of the message and the data included in the message. This is because the single message includes one or more data.

The first communication node 100$n$ extracts a data transmission and receipt request information from the data transmission and receipt request table which is held by the first communication node 100$n$. The data transmission and receipt request information is extracted with regard to the second communication node 200$m$ which is detected by the first communication node 100$n$. The data transmission and receipt request information is extracted with regard to the second communication node 200$m$ included in the data transmission and receipt request table which is held by the first communication node 100$n$. The data transmission and receipt request information are extracted for each of the data transmitted or received between the first communication node 100$n$ and the second communication node 200$m$. The data transmission and receipt request information are extracted based on the information representing the receipt request, the information representing the transmission request and the information representing neither of the receipt request nor the transmission request stored in the data transmission and receipt request table.

The first communication node 100$n$ converts the data included in the data transmission and receipt request information corresponding to the second communication node detected by the first communication node 100$n$ based on the correspondence of the message and the data included in the message data correspondence table.

The first communication node 100$n$ performs the operation setting, i.e. the transmission setting, the receipt setting or the no communication setting, of the first communication node 100$n$ based on information obtained by converting the data included in the extracted data transmission and receipt request information corresponding to the second communication node to the message.

Otherwise the configuration of the communication system according to the present variation is similar to that of the communication system of the present embodiment as described above.

In the present embodiment and the variation as described above, a message which has the same message ID and the same data configuration as those of the message transmitted and received between the second communication node 200$m$ and the first communication node 100$n$ may be at least transmitted or received between the plural first communication nodes 100$x$. It is possible to reduce a load of the first communication node 100$n$ by performing at least the transmission or the receipt of the messages having the same message ID and the same data configuration as described above. This is because it is not necessary for the first communication node 100$n$ to disassemble and reassemble the message which is at least transmitted or received between the second communication node 200$m$ and the first communication node 100$n$.

Otherwise a message which has a different message ID and a different data configuration from those of the message transmitted and received between the second communication node 200$m$ and the first communication node 100$n$ may be at least transmitted or received between the plural first communication nodes 100$x$. It is possible to perform a data communication efficiently by performing at least the transmission or the receipt of the messages having the different message IDs and the different data configuration with each other as described above. This is because it is possible to include more messages transmitted or received between the first communication nodes 100$x$ than the message transmitted or received between the second communication node 200$m$ and the first communication node 100$n$.

For example, a data amount which can be contained in a single packet according to CAN or LIN is eight bytes, but a data amount which can be contained in a single packet according to FlexRay is forty eight bytes.

According to the present embodiment and the variation as described above, it is necessary to perform a synchronous communication between the plural first communication nodes 100$x$. In other words, it is necessary to decide the transmission timing and the receipt timing of the messages communicated between the plural first communication nodes 100$x$. If an asynchronous communication is performed among the plural first communication nodes 100$x$, the transmission and receipt setting of a particular first communication node may be finished earlier than that of another first communication node. If the transmission and receipt setting of the particular first communication node is finished earlier than that of another first communication node, the particular first communication node may transmit the control message without performing the determination of the consistency of the transmission and receipt setting with another first communication node. In this case, if the particular first communication node transmits the control message, another first communication node may not be able to receive the control message. It is possible to synchronize the transmission timing and the receipt timing by performing the synchronous communication among the plural first communication nodes 100$x$. Accordingly, it is possible to suppress an occurrence of the first communication node which can not receive the transmission and receipt setting message and the control message.

According to the present embodiment and the variation as described above, CAN may be utilized for the communication between the plural first communication nodes 100$x$. CAN performs the asynchronous communication. If CAN is utilized for the communication between the plural first communication nodes 100x, it is necessary to control all of the first communication nodes 100x synchronously.

In this case, for example, it is necessary for each of the first communication nodes to transmit a message representing a completion of the transmission and receipt setting upon finishing the transmission and receipt setting to other first communication nodes. And at the same time, it is necessary for each of the first communication nodes to be able to receive the message representing a completion of the transmission and receipt setting from other first communication nodes. Each of the first communication nodes starts to transmit the control message after receiving the message as described above from other first communication nodes.

For example, in a case where CAN is utilized for the communication, the communication system waits for a designated period of time after the vehicle on which the communication system is mounted is powered on, in order to complete the transmission and receipt setting within the designated period of time. The first communication node starts to transmit the control message after the designated period of time has passed.

Although the embodiments of the present invention have been described in detail, it should be understood that the various changes, substitutions, and alterations could be made hereto without departing from the spirit and scope of the invention.

In the embodiment as described above, although the communication system is illustrated in functional block diagrams, the communication system may be realized by hardware, software or a combination of the hardware and the software.

The present application is a continuation application of International Application PCT/JP2010/070149 filed on Nov. 11, 2010 and designated the U.S., the entire contents of which are hereby incorporated by reference.

EXPLANATION FOR REFERENCE NUMERALS 50,60 communication bus
$100_n$ (n is an integer number (n>0)) first communication node
102 MPU (Micro-Processing Unit)
1022 communication node detector
1024 message transmission and receipt request extracting part
1026 transmission and receipt setting part
1028 consistency determining part
104 communication module
106 memory part
150 communication bus (first bus)
$200_m$ (m is an integer number (m>0)) second communication node
202 MPU (Micro-Processing Unit)
2022 message transmission controller
204 communication module
206 memory part
$250_m$ (m is an integer number (m>0)) communication bus (second bus)

The invention claimed is:

1. A system-communication node used in a communication system including a plurality of first communication nodes and one or more second communication nodes, one of the plurality of first communication nodes being the system-communication node, the one or more second communications nodes being connected to the system-communication node, the system- communication node comprising:

a processor and a memory and being configured to perform transmission or receipt of a signal with the one or more second communication nodes, the memory storing transmission and receipt request information representing a receipt request or a transmission request for each information transmitted or received between the system-communication node and the one or more second communication nodes, the transmission and receipt request information being prepared for the one or more second communication nodes connected to the system-communication node, the receipt request representing a request of the one or more second communication nodes for receipt of information, the transmission request representing a request of the one or more second communication nodes for transmission of information;

a communication node detector configured to detect the one or more second communication nodes connected to the system-communication node;

a transmission and receipt setting part, stored in the memory and executed by the processor, for performing a transmission setting or a receipt setting for each information based on the transmission request or the receipt request included in the transmission and receipt request information corresponding to the one or more second communication nodes detected by the communication node detector among the transmission and receipt request information stored in the memory;

a communication part configured to transmit information representing the transmission setting or the receipt setting set by the transmission and receipt setting part and to receive information representing transmission setting or receipt setting from another one of the first communication nodes; and a consistency determining part, stored in the memory and executed by the processor for determining consistency of the transmission setting or the receipt setting set by the transmission and receipt setting part and the transmission setting or the receipt setting received by the communication part from said another first communication node.

2. The system-communication node as claimed in claim 1, wherein the communication part starts to transmit a control message, if the consistency determining part determines that the consistency is maintained.

3. The system-communication node as claimed in claim 1, wherein the transmission and receipt setting part performs the transmission setting or the receipt setting again with regard to information included in the transmission and receipt request information corresponding to the second communication node detected by the communication node detector based on the transmission and receipt request information, if the consistency determining part determines that the consistency is not maintained.

4. The system-communication node as claimed in claim 1, wherein the communication part performs a communication with another first communication node in accordance with FlexRay.

5. The system-communication node as claimed in claim 1, wherein the consistency determining part determines that the consistency is maintained, if the transmission setting or the receipt setting set by the transmission and receipt setting part and the transmission setting or the receipt setting received from said another first communication node include a single transmission setting.

6. The system-communication node as claimed in claim 1, wherein the communication node detector detects the second communication node by performing a communication with the second communication node in a case where the system-communication node and the second communication node are connected by a communication wire.

7. The system-communication node as claimed in claim 1, wherein the communication node detector detects the second communication node based on variation of voltage applied to an electric cable or variation of current flowing through the electric cable, in a case where the system-communication node and the second communication node are connected by the electric cable.

8. The system-communication node as claimed in claim 1, wherein the information transmitted or received between the system-communication node and the second communication node is a message or data corresponding to a designated function, the data being included in a message.

9. A communication system including a plurality of first communication nodes and one or more second communication nodes, one of the plurality of first communication nodes being a system-communication node, the one or more second communications nodes being connected to the system-communication node, the system-communication node comprising:
  a processor and a memory and being configured to perform transmission or receipt of a signal with the one or more second communication nodes, the memory storing transmission and receipt request information representing a receipt request or a transmission request for each information transmitted or received between the system-communication node and the one or more second communication nodes, the transmission and receipt request information being prepared for the one or more second communication nodes connected to the system-communication node, the receipt request representing a request of the one or more second communication nodes for receipt of information, the transmission request representing a request of the one or more second communication nodes for transmission of information,
  a communication node detector configured to detect the one or more second communication nodes connected to the system-communication node;
  a transmission and receipt setting part, stored in the memory and executed by the processor, for performing a transmission setting or a receipt setting for each information based on the transmission request or the receipt request included in the transmission and receipt request information corresponding to the one or more second communication nodes detected by the communication node detector among the transmission and receipt request information stored in the memory;
  a communication part configured to transmit information representing the transmission setting or the receipt setting set by the transmission and receipt setting part and to receive information representing transmission setting or receipt setting from another one of the first communication nodes; and
  a consistency determining part, stored in the memory and executed by the processor, for determining consistency of the transmission setting or the receipt setting set by the transmission and receipt setting part and the transmission setting or the receipt setting received by the communication part from said another first communication node.

10. A method for performing a communication in a communication system including plural a plurality of first communication nodes and one or more second communication nodes, one of the plurality of first communication nodes being a system-communication node, the one or more second communications nodes being connected to the system-communication node, the system-communication node comprising a processor and a memory and being configured to perform transmission or receipt of a signal with the one or more second communication nodes, the memory storing transmission and receipt request information representing a receipt request or a transmission request for each information transmitted or received between the system-communication node and the one or more second communication nodes, the transmission and receipt request information being prepared for the one or more second communication nodes connected to the system-communication node, the receipt request representing a request of the one or more second communication nodes for receipt of information, the transmission request representing a request of the one or more second communication nodes for transmission of information, the method comprising:
  detecting, by a communication node detector, the second communication node connected to the system-communication node;
  performing a transmission setting or a receipt setting for each information based on the transmission request or the receipt request included in the transmission and receipt request information corresponding to the one or more second communication nodes detected by the communication node detector among the transmission and receipt request information stored in the memory;
  transmitting information representing the transmission setting or the receipt setting set by the transmission and receipt setting part;
  receiving, by a communication part, information representing transmission setting or receipt setting from another one of the first communication nodes; and
  determining consistency of the transmission setting or the receipt setting set by the transmission and receipt setting part and the transmission setting or the receipt setting received by the communication part from said another first communication node, wherein the transmission and receipt setting part is stored in the memory and executed by the processor.

* * * * *